Patented Apr. 18, 1944

2,346,702

UNITED STATES PATENT OFFICE 2,346,702

VULCANIZING OIL

Herbert S. Polin and Albert I. Nerken, New York, N. Y.; said Nerken assignor to said Polin No Drawing. Application September 14, 1940, Serial No. 356,732

1 Claim. (Cl. 260—399)

This invention relates to a new method for the treatment of unsaturated oils, particularly of the semi-drying and non-drying types, such for example as oil of the genus coffea, to produce sulfurized products, commonly known as "factice."

The production of products of a wide range of physical properties by the reaction of oils (of organic origin) with sulfur or sulfur-bearing compounds is well known. The products so produced are known as "factice." Two types of factice are generally recognized, "brown factice" and "white factice." In general, the brown factice is obtained by heating oils with elemental sulfur at an elevated temperature, the white factice, by treating oils with sulfur chloride at room temperature or thereabouts. The brown factice requires prolonged heating, and, particularly with semi-drying or non-drying oils, frequently yields products which are sticky viscous liquids, lacking in elasticity. The reaction with sulfur chloride is much more rapid, but still requires in the neighborhood of an hour for completion to the state of a rubbery mass.

The time element, even when an accelerator is used, and the nature of the product are both undesirable in the present practice for producing brown factice. The large quantities of sulfur chloride required for the white factice are undesirable from both an economic and a hygienic point of view. The present invention discloses a means for avoiding the above-mentioned undesirable elements and obtaining a product which shares the good qualities of both types of factice.

The first step in the process proceeds in the typical manner. The oil to be reacted is heated to an elevated temperature, say in the neighborhood of 150° C., and sulfur added to it. The sulfur may be added at a temperature below 150° if desired. The amount of sulfur used will vary, depending on the physical properties desired in the final product; 15 to 20% are typical proportions of sulfur. Now, in previous procedures, the mixture is held at the elevated temperature for an extended period, say five hours or more. In the present invention the elevated temperature is maintained only long enough so that, on cooling the mixture, sulfur does not precipitate, i. e., the sulfur has reacted with the oil.

Many variations on the above procedure are suggested. For instance, the oil may be in an emulsified state or diluted with solvents, the sulfur may be colloidal, the reaction may be conducted under pressure, etc. Accelerators and activators may be employed. These and other variations do not depart from the intention of the present patent. The essential consideration is the reacting of the oil and sulfur for a minimum time at an elevated temperature.

On cooling the mixture, a more or less viscous liquid is obtained which does not resemble typical factice. In this state the product has little value, and it is this fact which dictated the lengthy heating in previous procedures.

According to the present invention, however, the physical state of the viscous liquid is changed quickly and simply. To the viscous product obtained in the first step above, is added, with stirring, a small amount, about 5% or less, of sulfur chloride. Immediately on intimate mixing, within about 15 seconds or less, the whole mixture changes into a tough, rubbery, coherent mass. This rapid reaction, with a comparatively very small addition of sulfur chloride, at a low temperature, has to our knowledge never before been disclosed or observed.

The rubbery mass so obtained may be washed with water or an alkali solution and is then ready for application in any of the ways which factice has been employed, e. g., as a rubber substitute, in linoleum compositions, in paints and lacquers, etc.

Having described the invention, what is claimed for Letters Patent is:

Process for vulcanizing oil of the genus coffea, which comprises: reacting said oil with elemental sulfur amounting to at least about 15 percent, at elevated temperature until a homogeneous liquid, substantially free from said elemental sulfur, is obtainable on cooling, thereafter cooling and adding thereto not more than about 5 per cent of sulfur chloride and sufficient to promptly produce a solid rubbery mass.

HERBERT S. POLIN.
ALBERT I. NERKEN.